(12) United States Patent
Thomas

(10) Patent No.: US 7,473,012 B1
(45) Date of Patent: Jan. 6, 2009

(54) WINDOW ASSEMBLY AND LIGHTING ASSEMBLY THEREFOR

(76) Inventor: Bud H. Thomas, 3875 N. Farm Rd., 197, Springfield, MO (US) 65803

( * ) Notice: Subject to any disclaimer, the term of this patent is extended or adjusted under 35 U.S.C. 154(b) by 0 days.

(21) Appl. No.: 11/647,705

(22) Filed: Dec. 29, 2006

Related U.S. Application Data

(63) Continuation of application No. 10/726,123, filed on Dec. 2, 2003, now Pat. No. 7,162,840.

(51) Int. Cl.
*F21V 3/00* (2006.01)
*F21V 5/00* (2006.01)

(52) U.S. Cl. .................. 362/311; 362/503

(58) Field of Classification Search .......... 362/311, 362/503
See application file for complete search history.

(56) References Cited

U.S. PATENT DOCUMENTS

| | | | |
|---|---|---|---|
| 2,760,113 A | 8/1956 | Danek | |
| 3,680,237 A * | 8/1972 | Finnerty, Sr. | 40/544 |
| 4,806,903 A | 2/1989 | Rust | |
| 6,116,678 A | 9/2000 | Beck | |
| 6,382,821 B1 * | 5/2002 | Heyer et al. | 362/509 |
| 2002/0172053 A1 | 11/2002 | Pastrick et al. | |

\* cited by examiner

*Primary Examiner*—Sandra O'Shea
*Assistant Examiner*—James W Cranson
(74) *Attorney, Agent, or Firm*—Richard L. Marsh

(57) ABSTRACT

A window assembly comprising an elongated transparent pane, at least one lighting assembly and at least one opaque covering, the elongated transparent pane having the opaque covering associated with the interior surface thereof and having the lighting assembly mounted adjacent the interior surface of the opaque covering, the opaque covering having at least one aperture disposed therethrough wherein light emanating from the lighting assembly is visible from the exterior surface of the window assembly.

4 Claims, 6 Drawing Sheets

WINDOW ASSEMBLY AND LIGHTING ASSEMBLY THEREFOR

RELATED APPLICATION DATA

This application is a continuation of Applicant's application Ser. No. 10/726,123, filed on 2 Dec. 2003, now U.S. Pat. No. 7,162,840.

BACKGROUND OF THE INVENTION

1. Field of the Invention

This invention relates to a one-piece automotive a window assembly having courtesy and decorative lighting.

2. Prior Art Statement

It is known to provide a window glass assembly having decorative and courtesy lighting embedded in a metal panel alongside the window glass assembly. For instance, see FIG. 3 wherein the side window assembly of a conventional limousine comprises two window glass portions separated by one metal panel and further having a metal panel at each end of the side window assembly. Each metal panel has a decorative lighting assembly associated with the metal panel. Although two window glass portions are described in reference to FIG. 3, other conventional limousines use one window glass having a metal panel at each end.

It is also known to provide a vehicle side including an elongated opening in the vehicle side which receives therein a window pane seated in the opening, the elongated opening having opposed ends with an internal panel adjacent at least one end and positioned so that a portion of the panel overlies the opening, an essentially opaque material disposed between at least an end portion of an interior surface of the window pane and the portion of the panel overlying the opening, and at least one lamp attached to the window pane on an exterior surface portion of the window pane opposite the panel. For instance, see the U.S. Pat. No. 6,116,678 issued on Sep. 12, 2000 to Gregory S. Beck. Wiring to the lighting elements passes through holes drilled through the glass, the holes providing opportunity for intrusion of elements. Furthermore, since the lighting elements are on the exterior of the pane, damage to the lighting elements often occurs.

It is further known to provide a stop light assembly mounted behind a window glass, particularly a rear window glass of an automobile, for indicating a stopping motion of the vehicle. For instance, see U.S. Pat. No. 2,760,113 issued on Aug. 21, 1956 to August J. Danek. Such stop light assemblies have become commonplace as required by law, some having sophisticated mountings directly to the glass of the automobile or integral with the back glass. Such stop light assemblies generally permit observance of the light through a clear portion of the window however some stop light assemblies are also mounted for observance through a tinted portion of the window glass. For the latter, see U.S. Pat. No. 4,806,903 issued on Feb. 21, 1989 to John Rust.

Classic Limousine of Fountain Valley Calif., U.S.A., provides a single piece side glass with hidden ultra-luminescent opera lights, known as "California Neon," by affixing a solid sheet of luminescent material to an inside surface of a tinted window glass. When an electrical current is applied to the sheet, the sheet of luminescent material luminesces which is visible in the tinted window. For instance, see the copy of the web page from Classic Limousine. The amount of light from the luminescent material passing through either of a clear glass or a tinted window is insignificant. Conversely, in the instant invention, the amount of light visible from the exterior of the window assembly approximates the amount of light observed on a conventional limousine.

Finally, it is known to provide vanity mirror or an exterior mirror assembly for an automobile having an opaque major portion of the interior surface. For instance, in an exterior mirror assembly including a housing, a mounting member and reflective element, the mounting member being adapted to mount to the vehicle, the mirror assembly further having a reflective element comprising a substrate and a reflective coating on the substrate wherein a portion of the reflective coating is removed from the substrate to form a window, at least one light assembly wherein the light assembly projects a first light pattern through the window from the exterior mirror assembly downwardly and rearwards from the vehicle window mirror assembly is in the normal position and further projecting a second light pattern from the exterior mirror assembly downwardly and rearwardly when the housing is in a folded position. The mirror assembly includes a light conduiting member and at least one light source, the light conduiting member directing light from the light source in the first and second light patterns. For instance, see the U.S. Patent application 2002/0172053 A1 published on Nov. 21, 2002 to Pastrick, et al. The opaque portion of the mirror assembly covers a major portion of the surface area of the total surface whereas in the instant invention, only a minor portion of the total surface area is opaque. Additionally, the lighting associated with such a mirror assembly is generally spaced from the interior surface of the mirror whereas in the instant invention, the lighting assembly is substantially integral with the interior surface and may be affixed thereto.

SUMMARY OF THE INVENTION

There is a need for a novel window assembly for use in vehicles such as luxury limousines and automobiles or for decorative and accent lighting in homes and industrial locations. Therefore, it is one object of this invention to provide a window assembly for vehicles comprising an elongated transparent pane, at least one lighting assembly and at least one opaque covering, the elongated transparent pane having the opaque covering associated with the interior surface thereof and the lighting assembly associated with the interior surface thereof, the opaque covering having at least one aperture disposed therethrough wherein light emanates from the lighting assembly through the exterior surface of the window assembly.

Another object of this invention is to provide a window assembly comprising an elongated transparent pane, a lighting assembly and at least one opaque covering wherein the opaque covering is applied to the opposite ends of the elongated transparent pane, the opposite ends having a lighting assembly mounted adjacent the interior surface thereof directly behind the opaque covering.

An aim of this invention is to provide a window assembly for vehicles comprising an elongated transparent pane, a lighting assembly and at least one opaque covering wherein the opaque covering covers a minor area of the interior surface adjacent the opposite ends of the elongated transparent pane.

A feature of this invention is to provide a window assembly for vehicles comprising an elongated transparent pane, a lighting assembly and at least one opaque covering wherein the opaque covering is selected from the group comprising elastomeric film, paint, metallic panel and elastomeric panel.

Another feature of this invention is to provide a window assembly for vehicles comprising an elongated transparent pane, a lighting assembly and at least one opaque covering wherein the opaque covering is adhesively affixed to the interior surface of the elongated transparent pane.

Another purpose of this invention is to provide a window assembly for vehicles comprising an elongated transparent pane, a lighting assembly and at least one opaque covering wherein the opaque covering is applied to the opposite ends of the elongated transparent pane and to at least one other area of the interior surface of the elongated transparent pane between the opposite ends.

An intention of this invention is to provide a window assembly for vehicles comprising an elongated transparent pane, a lighting assembly and at least one opaque covering wherein the opaque covering is applied to the opposite ends of the elongated transparent pane and to at least one other area of the interior surface of the elongated transparent pane between the opposite ends wherein the opposite ends and the other area each have the lighting assembly mounted adjacent the interior surface thereof, the lighting assembly aligned with apertures disposed through the area having the opaque covering applied thereto.

A major purpose of this invention is to provide a window assembly comprising an elongated transparent pane, at least one lighting assembly, at least one translucent covering and at least one opaque covering, the elongated transparent pane having the opaque covering and the translucent covering associated with the interior surface thereof, the window assembly further having the lighting assembly mounted adjacent the interior surface of the translucent covering, the opaque covering having at least one aperture disposed therethrough wherein light emanating from the lighting assembly is visible from the exterior surface of the window assembly.

Another object of this invention is to provide a window assembly comprising an elongated transparent pane, at least one lighting assembly, at least one translucent covering and at least one opaque covering, the elongated transparent pane having the opaque covering associated with the interior surface thereof and the translucent covering associated with the interior surface thereof, the translucent covering preferably a tinted covering.

A goal of this invention is to adhere an opaque covering to an elongated transparent pane over a minor portion of the pane and adhere a translucent covering to a majority of the remainder.

A final object of this invention is to provide an opaque covering for an elongated transparent pane, the opaque covering associated with an interior surface of the elongated transparent pane, the opaque covering having at least one aperture disposed therethrough for allowing transmission of light from a lighting assembly mounted adjacent an interior surface of the elongated transparent pane through the at least one aperture.

DESCRIPTION OF THE PREFERRED EMBODIMENTS

While the various features of this invention are hereinafter described and illustrated as a one-piece window assembly for a vehicle, the window assembly having courtesy and decorative lighting associated therewith, it is to be understood that the various features of this invention can be used singly or in various combinations thereof for a window assembly with associated lighting as can hereinafter be appreciated from a reading of the following description.

Figure 1:
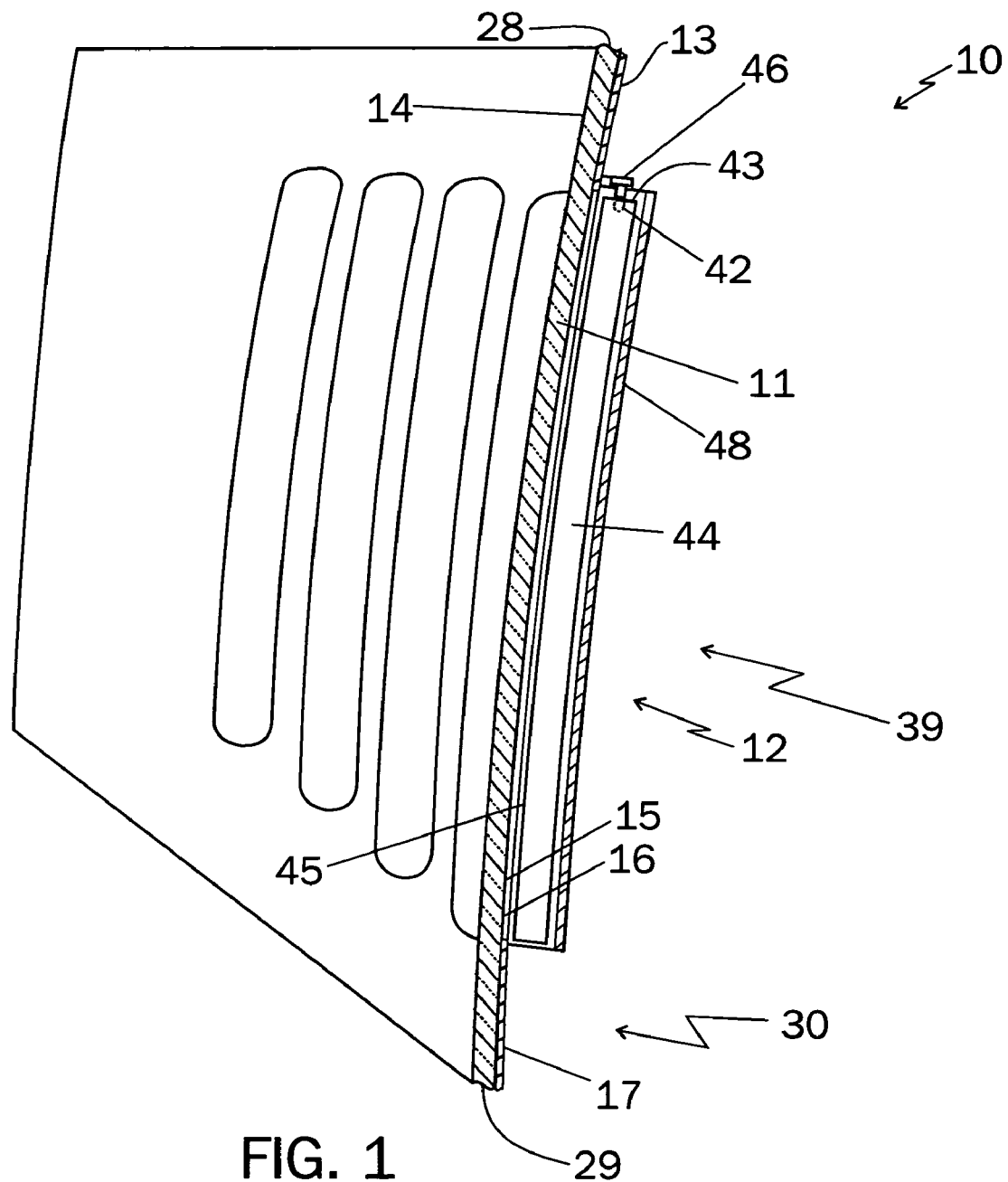
FIG. 1 is a partial perspective cross section view of the window assembly of this invention.
Figure 2:
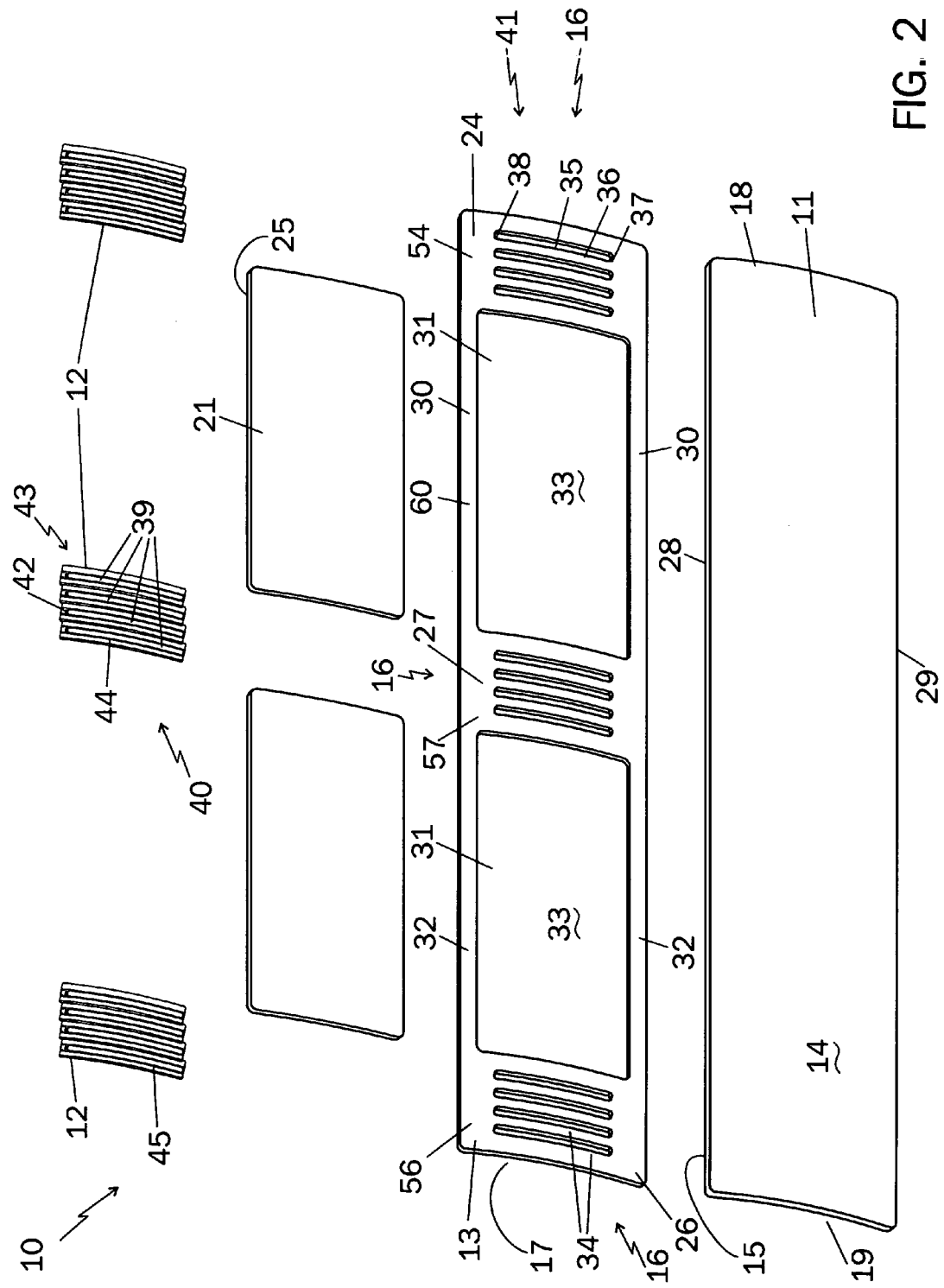
FIG. 2 is an exploded perspective view of a side window assembly of the preferred embodiment of this invention.
Figure 3:
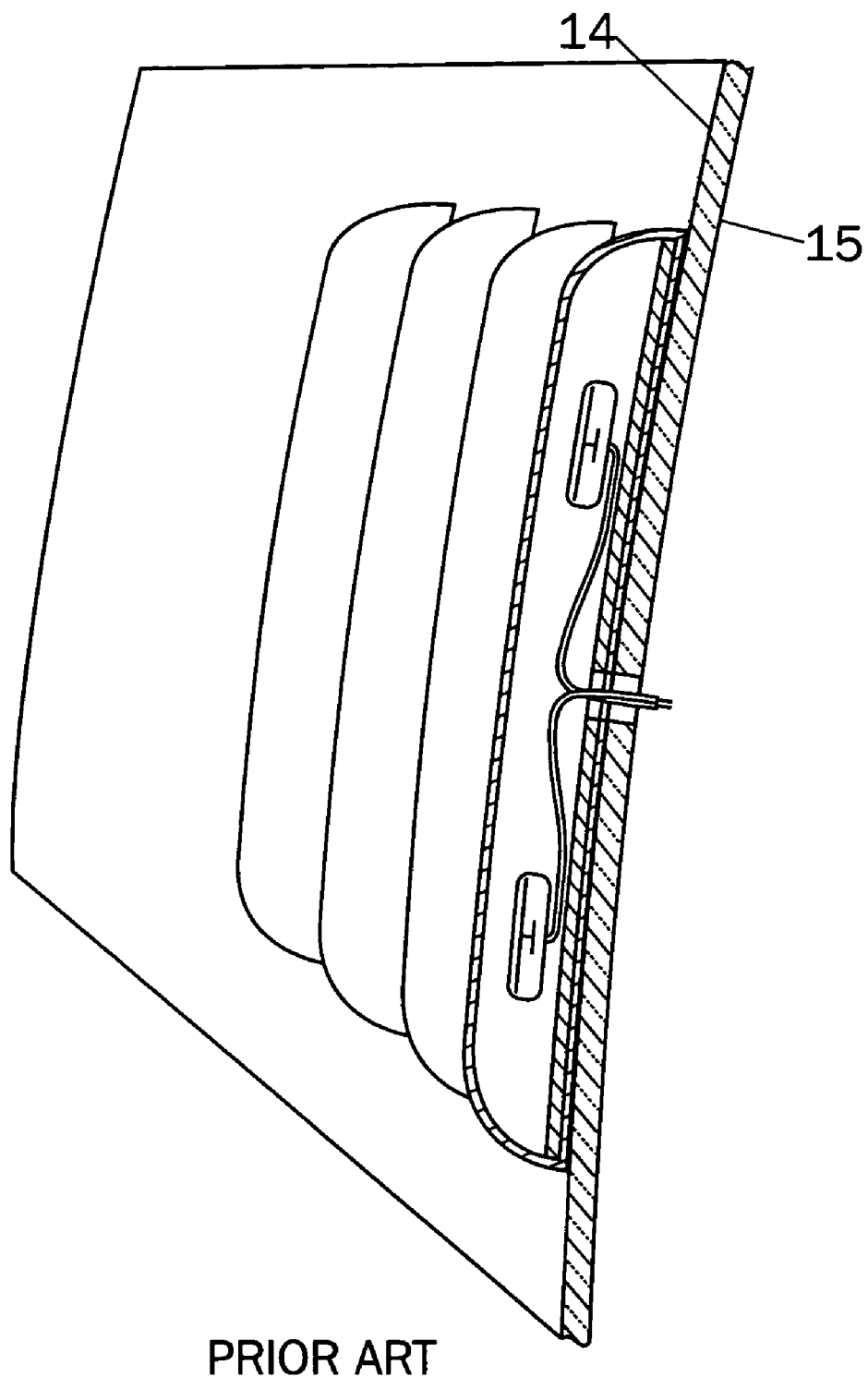
FIG. 3 is a partial perspective cross section view of a conventional limousine window showing opera lighting protruding from the metal panel between separate window panes.

Referring now to FIGS. 1 and 2, the novel window assembly for use in luxury limousines and automobiles or for decorative and accent lighting in homes and industrial locations is generally shown by the figure number 10. Window assembly 10 comprises an elongated transparent pane 11, a lighting assembly 12 and at least one opaque covering 13. Elongated transparent pane 11 has opaque covering 13 applied to the interior surface 15 thereof and lighting assembly 12 mounted adjacent interior surface 15. Opaque covering 13 has at least one aperture 16 disposed therethrough wherein light emanates from lighting assembly 12 through exterior surface 14 of window assembly 10, the light functioning as decorative or accent lighting. Preferably, as shown in FIG. 2, window assembly 10 has opaque covering 13 applied to the opposite ends 18, 19 of elongated transparent pane 11, opposite ends 18, 19 each having lighting assembly 12 applied to interior surface 17 of opaque covering 13 at ends 18, 19. Referring also to FIG. 1, window assembly 10 generally has opaque covering 13 covering only a minor area 24 of interior surface 15 adjacent end 18 and a similar minor surface area 26 adjacent end 19 of elongated transparent pane 11. Additionally, opaque covering 13 preferably also has at least one sight window 31 disposed therethrough and may have more than one sight window 31 substantially as shown in the figures. Where more than one sight window 31 is provided, opaque covering 13 also preferably covers at least one other area 27 of interior surface 15 of elongated transparent pane 11 between the multiple sight windows 31 thus separating the sight windows 31. As shown in the figures, only one other area 27 is shown, however, it should be fully understood that more than one other area 27 may be located along the length of elongated transparent pane 11 between ends 18, 19. Furthermore, it is preferred that opaque covering 13 additionally covers a minor peripheral area 30 of interior surface 15 adjacent the elongated top and bottom edges 28, 29, respectively, of elongated transparent pane 11 thus providing a broad border 32 surrounding window assembly 10. Preferably, broad border 32 is of the same material as opaque covering 13 covering areas 24, 26 and 27 and continuous therewith, however, broad border 32 may be of a different material thus simulating a frame work for window assembly 10. Broad boarders 32 are well known in the art and are described here to provide a complete description of the construction of window assembly 10. Broad boarders 32 generally are used to obscure supporting structure for window assembly 10 and as a backing for interiorly applied trim pieces.

In window assembly 10, opaque covering 13 may be selected from the group comprising elastomeric film, paint, metallic or elastomeric panel, ink, hardenable liquid polymers and combinations thereof, however, it is preferred that paint be silk-screened onto interior surface 15. In FIG. 2, opaque covering 13 is shown separated from elongated transparent pane 11 primarily for clarity however it should be fully understood that opaque covering 13 may be a separate material such as the aforementioned elastomeric film or a metallic or elastomeric panel. Preferably, interior surface 15 is thoroughly cleaned and the paint used for silk-screening onto interior surface 15 has an affinity for elongated transparent pane 11 thus adhering directly thereto without additional treatment. In the preferred embodiment, areas 24, 26, 27 and 30 are simultaneously applied by the aforementioned silk-screening process and therefore opaque covering 13 would appear as shown in FIG. 2 if opaque covering 13 could be readily removed from interior surface 15 of elongated transparent pane 11. Alternately, areas 24, 26, 27 and 30 may be applied in separate processes without departing from the scope of this invention.

Referring now to FIG. 2, window assembly 10 comprises elongated transparent pane 11, lighting assembly 12 and opaque covering 13 wherein elongated transparent pane 11 has opaque covering 13 associated with interior surface 15 thereof and lighting assembly 12 associated with interior surface 17 of opaque covering 13. As in the preferred embodiment, opaque covering 13 has at least one aperture 16 disposed therethrough wherein light emanates from lighting assembly 12 through exterior surface 14 of window assembly 10. In this alternate embodiment as best shown in FIG. 2, window assembly 10 has opaque covering 13 adjacent opposite ends 18, 19 of elongated transparent pane 11, opposite ends 18, 19 each having lighting assembly 12 associated with interior surface 17 of opaque covering 13 at ends 18, 19. Window assembly 10 generally has opaque covering 13 covering at least a minor area 24 of interior surface 15 adjacent end 18 and a similar minor surface area 26 adjacent end 19 of elongated transparent pane 11. Additionally, opaque covering 13 also has at least one sight window 31 disposed therethrough and may have more than one sight window 31 substantially as hereinbefore recited. Where more than one sight window 31 is provided, opaque covering 13 also is associated with and covers at least one other area 27 of interior surface 15 of elongated transparent pane 11 between the multiple sight windows 31 thus separating the sight windows 31. As shown in the figures, only one other area 27 is shown, however, it should be fully understood that more than one other area 27 may be located along the length of elongated transparent pane 11 between ends 18, 19. Furthermore, opaque covering 13 additionally covers a minor peripheral area 30 of interior surface 15 adjacent the elongated top and bottom edges 28, 29, respectively, of elongated transparent pane 11 thus providing broad border 32 surrounding window assembly 10. Preferably, broad border 32 is of the same material as opaque covering 13 covering areas 24, 26 and 27 and continuous therewith, however, broad border 32 may be of a different material thus simulating frame work for window assembly 10. As opaque covering 13 is associated with elongated transparent pane 11, opaque covering 13 is a single piece but initially a separate element and is captured in a track or gasket groove along with elongated transparent pane 11 at assembly of window assembly 10. Window assembly 10 is then bolted to the vehicle body in a conventional manner. Where separate pieces 54, 56, 57 and 60 are associated with elongated transparent pane 11, a temporary means of holding separate pieces 54, 56, 57 and 60 together is generally necessary while assembling window assembly 10 whereafter the temporary means of holding may be removed. In this embodiment, lighting assembly 12 is arranged adjacent interior surface 17 of opaque covering 13 and held in place by other elements of window assembly 10.

Sight windows 31 are generally clear, however, sight windows 31 may be covered with a translucent covering 21, translucent covering 21 preferably tinted to effectively allow one-way transmission of sight through window assembly 10 from a position facing interior surface 25 of translucent covering 21 as is conventional in luxury limousines and coaches. Translucent covering 21, when installed in the preferred embodiment, is applied to interior surface 15 of elongated transparent pane 11 in the areas 33 conforming precisely to sight windows 31 though translucent covering 21 may overlap a portion of broad border 32 and separate areas 24, 26 and 27. In the preferred embodiment shown in FIG. 2, translucent covering 21 conforms exactly to sight windows 31 thus not extending into areas 24, 26 or 27 and therefore apertures 16 allow for clear transmission of light from lighting assembly 12 through the elongated transparent pane 11. In the alternate embodiment recited above where opaque covering 13 is associated with but separate from elongated transparent pane 11, translucent covering 21 may also be associated with elongated transparent pane 11 and may be captured between elongated transparent pane 11 separate area pieces 54, 56, 57 and 60.

Figure 4:
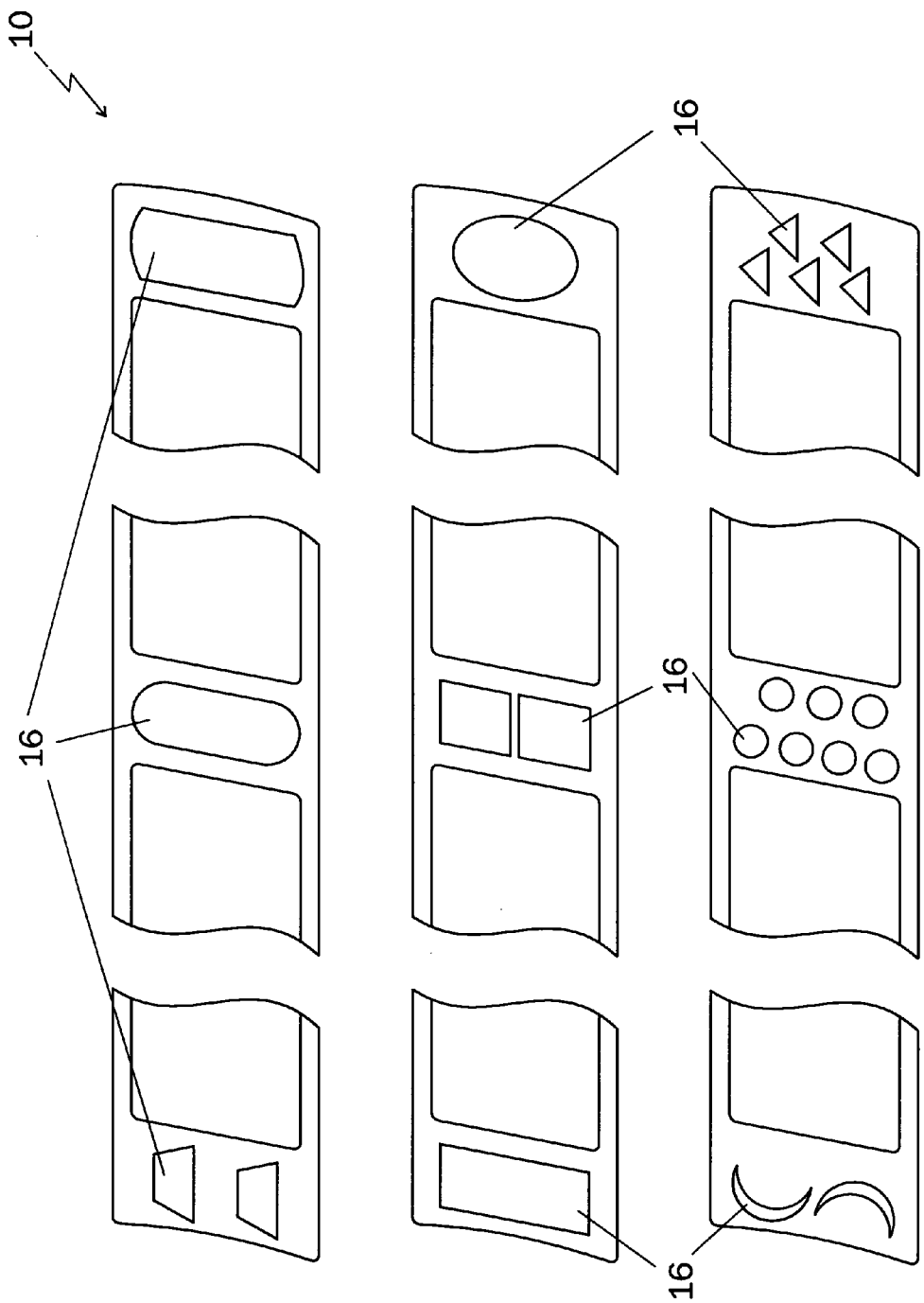
FIG. 4 is an enlarged view of alternative apertures for the preferred window assembly of this invention.

Apertures 16 generally comprise a plurality of spaced apart, elongated slots 34, spaced apart, elongated slots 34 selected from the group comprising rectangles, ellipses, trapezoids, parallelograms, circles and minor portions or combinations thereof as can be inferred from the shapes shown in FIG. 4. Preferably, elongated slots 34 comprise parallel edges 35, 36 and rounded ends 37, 38 such that elongated slots 34, when illuminated by lighting assembly 12, appear as opera lights generally associated with luxury limousines and coaches. As lighting assembly 12 is aligned with aperture 16 behind each area 24, 26 and 27, light emanating from each lighting assembly 12 passes through elongated transparent pane 11 uninhibited as aperture 16 is directly exposed to interior surface 15 of elongated transparent pane 11. In the preferred embodiment, lighting assembly 12 comprises a plurality 40 of individual lighting elements 39, lighting elements 39 aligned with plurality 41 of spaced apart, elongated slots 34. Preferably, lighting elements 39 are substantially contiguous with the interior surface 17 of opaque covering 13 and may be affixed directly thereto to provide for direct transmission of light through the elongated slots 34. Alternately, lighting assembly 12 may be affixed to a bracket or clip pending from a portion of the mounting structure of vehicle 20 and likewise, individual elements 39 may also be affixed to individual brackets or clips associated with window assembly 10 without departing from the scope of this invention. Though the preferred embodiment shown in FIG. 2 comprises elongated slots 34 and individual lighting elements 39 directly aligned therewith, it is to be fully understood that lighting assembly 12 may have a greater or fewer number of lighting elements 39 and still fall within the scope of this invention.

Figure 5:
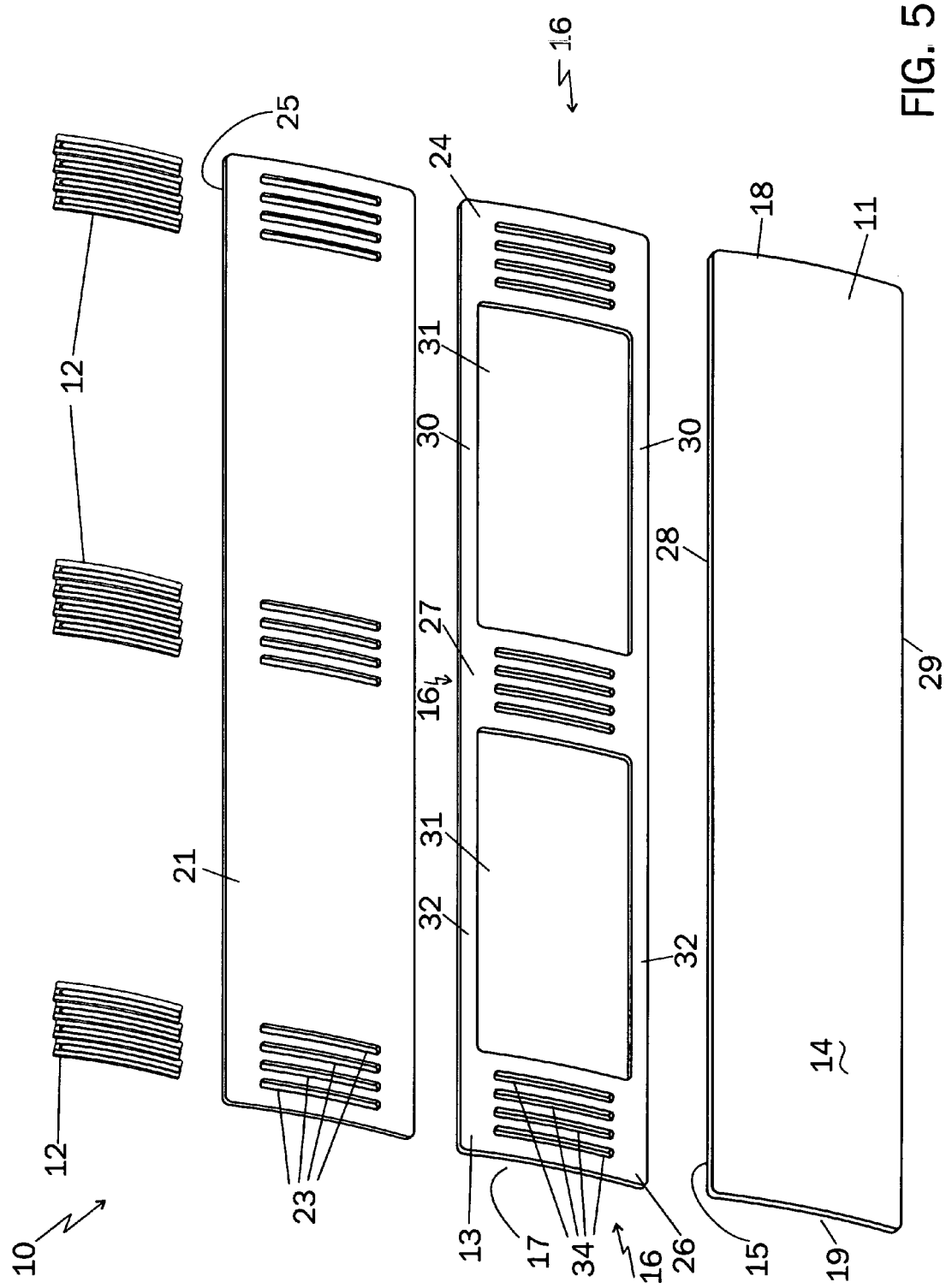
FIG. 5 is an exploded perspective view of an alternate side window assembly of this invention.

Window assembly 10 may also have opaque covering 13 adhered to interior surface 15 and may additionally have lighting assembly 12 adhered to interior surface 17 of opaque covering 13 with lighting assembly 12 aligned with areas 24, 26 and 27. Thus, window assembly 10 has one lighting assembly 12 at each of opposite ends 18, 19, lighting assembly 12 mounted adjacent interior surface 17 of opaque covering 13 wherein one lighting assembly 12 is aligned with area 24 and a second lighting assembly 12 aligned with area 26. Likewise where other area 27 of opaque covering 13 is applied on interior surface 15 of elongated transparent pane 11, one lighting assembly 12 is also aligned with other area 27. It should be apparent here that window assembly 10 may have additional other areas 27 separating additional sight windows 31 depending upon the total length of the elongated transparent pane 11 between opposite ends 18, 19. In this embodiment, opaque covering 13 is separately manufactured with apertures 16 disposed therethrough and opaque covering 13 is arranged in proximity to interior surface 15 of elongated transparent pane 11 and adhered thereto. Opaque covering 13 may have an adhesive backing that is removed upon joining opaque covering 13 with elongated transparent pane 11 or liquid adhesives may be used between opaque covering 13 and elongated transparent pane 11. In like manner, translucent covering 21 may be joined to elongated transparent pane 11 in applications where translucent covering 21 is used. For example, some window assemblies 10 may have translucent covering 21 adhered to elongated transparent pane 11 in the area 33 described by sight windows 31 but translucent covering 21 is generally not adhered in areas described by apertures 16. Thus, the light emanating from lighting assembly 12 through apertures 16 is not reduced in intensity at exterior surface 14 of window assembly 10. Though translucent covering 21 has just been described as applied in the area 33 described by sight windows 31, translucent covering 21 may be produced in a large sheet form which covers substantially the entirely of interior surface 17 of opaque covering 13 or interior surface 15 of elongated transparent pane 11 as shown in FIG. 5. In this instance, translucent covering 21 has at least one aperture 23 disposed therethrough, wherein each aperture 23 disposed through translucent covering 21 is aligned with a respective aperture 16 disposed through opaque covering 13. Translucent covering 21 may be adhered to interior surface 17 of opaque covering 13 with opaque covering 13 adhered to interior surface 15 of the elongated transparent pane 11 or alternately translucent covering 21 may be adhered to interior surface 15 of elongated transparent pane 11 with opaque covering 13 adhered to interior surface 25 of translucent covering 21. Where window assembly 10 is provided with translucent covering 21 spanning substantially the entire length of elongated transparent pane 11, preferably translucent covering 21 is a tinted material and thus tinted sight windows 31 are created by translucent covering 21.

Lighting elements 39 of lighting assemblies 12 may comprise fiber optic, ultra-electro-luminescent panels, fluorescent tubes, single light sources such as incandescent bulbs but preferably, lighting elements 39 are elongated polymeric bars 44 with a light source 42 at one end 43. Elongated polymeric bars 44 are preferably hard, clear acrylic, however, other polymeric materials may be used to advantage. Lighted elongated polymeric bars are currently used as opera lighting on limousines wherein the elongated polymeric bar is attached to the exterior of the window with electrical leads disposed through the window pane into the interior of the vehicle 20. In the instant invention, elongated polymeric bars 44 are associated with interior surface 15 of elongated transparent pane 11 and therefore the electrical leads are contained within the interior of the vehicle 20. Light source 42 may be a fiber optic cable, incandescent light, fluorescent tube or ultra-electro-luminescent panel, but preferably is a Light Emitting Diode (LED). Preferably, the LED emits white light, however, as end 43 of elongated polymeric bar 44 within lighting assembly 12 is readily accessible, LED's may easily be changed to provide for ultraviolet, infrared or other colors as desired, thus providing for different lighting effects. Furthermore, as end 43 of elongated polymeric bar 44 is accessible from the interior of the vehicle 20, maintenance replacement of light source 42 is made easier. In fact, replacement of lighting assembly 12 is possible from within the interior of the vehicle 20 and thus lower labor cost are realized. Finally, it should be readily recognized that the integrity of window assembly 10 is preserved by associating lighting assemblies 12 with interior surface 15 of elongated transparent pane 11 as no holes must be drilled through elongated transparent pane 11 to provide for electrical leads.

Figure 6:
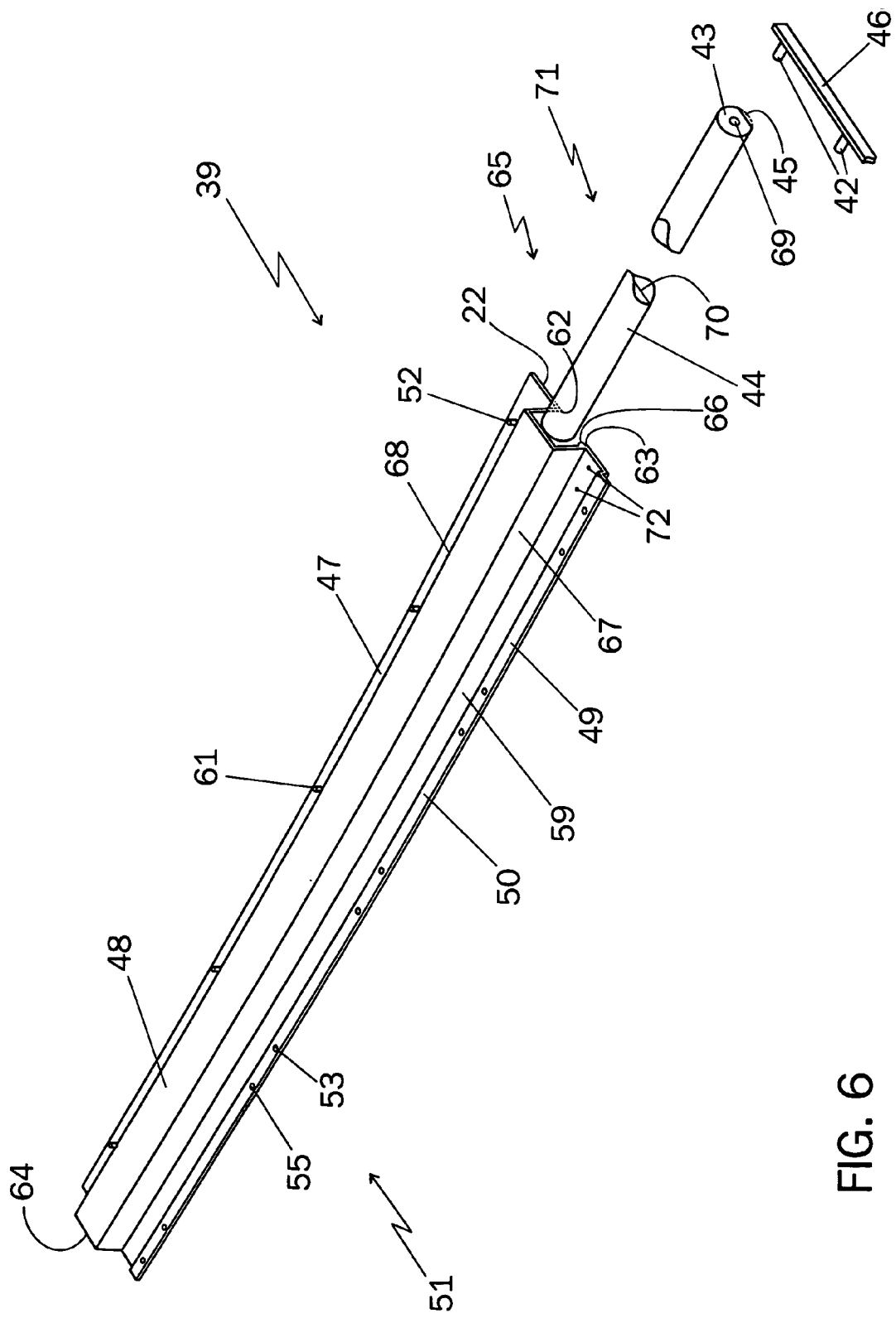
FIG. 6 is an exploded perspective view of the lighting assembly of this invention.

Referring now to FIG. 6, individual lighting elements 39 comprise housing 48, elongated polymeric bar 44 and a lighting source 42. Preferably, multiple lighting elements 39 are arranged side-by-side and a circuit board 46, having a plurality of light sources 42 mounted thereupon, is arranged proximate the ends 43 of polymeric bars 44. In the preferred embodiment, housing 48 has a flat flange 47 and a stepped flange 49, stepped flange 49 adapted to be overlaid over flat flange 47 when assembling individual lighting elements 39 into lighting assembly 12. Stepped flange 49 has a plurality of pairs of holes 51 disposed through step 50, holes 51 arranged to receive protrusion 52 in one hole 53, 55 of the pair of holes 51 to allow lighting assembly 12 to be utilized on either the right hand side of vehicle 20 or the left hand side of vehicle 20 in an angled relationship thereto. For instance, when protrusions 52 of one housing 48 are placed in leading holes 55 of pairs 51 of an adjacent housing 48, lighting assembly 12 will assume an upper left to lower right angled position generally used on the left side of vehicle 20 whereas when protrusions 52 of one housing 48 are placed in trailing holes 53 of pairs 51 of an adjacent housing 48, lighting assembly 12 will assume an upper right to lower left angled position generally used on the right side of vehicle 20. As step 50 of stepped flange 49 lies directly upon flat flange 47, bottom surface 22 of flat flange 47 becomes an extension of bottom surface 58 of inner leg 59 of stepped flange 49 and thus provides a substantially continuous flat surface for mounting of lighting assembly 12 to interior surface 17 of opaque covering 13. When assembling individual lighting elements 39 side-by-side into lighting assembly 12, top ends 61 of protrusions 52 are mushroomed to retain housings 48 of individual lighting elements 39 in a fixed relationship. Since housing 48 is formed from an opaque thermoplastic material, stepped flange 49 and flat flange 47 provide shielding to present observation of internal structure behind lighting assembly 12. Additionally, since housing 48 is a thermoplastic material, protrusions 52 are also thermoplastic and therefore have top end 61 thereof thermally displaced using a heated riveting tool. Though housings 48 are shown with pairs of holes 51 allowing for a predetermined right hand or left hand angled relationship between individual lighting elements 39 by inserting protrusion 52 through only one hole 53, 55 of each pair, it should be readily apparent that more pairs of holes 51 could be disposed through stepped flange 49 to allow for other angular relationships between individual lighting elements 39. Though the preferred method of assembling housings 48 has been described as a post, that is protrusion 52, in a hole 53, 55 method, other means of assembling housings 48 together, such as bolting, gluing or thermally sealing the flanges 47, 49 thereof are contemplated within the scope of this invention. Thus, lighting assembly 12 for window assembly 10 comprises a plurality of lighting elements 39, lighting elements 39 comprising elongated housing 48, a light transmitting medium 71 and at least one light source 42, light transmitting medium 44 carried by and captured in elongated housing 48, light transmitting medium 44 having light source 42 associated with one end 43 thereof. Light transmitting medium preferably comprises an elongated polymeric bar 44 having a cross sectional shape selected from the group comprising rectangles, ellipses, trapezoids, parallelograms, circles and minor portions or combinations thereof. In the preferred embodiment, elongated polymeric bar 44 has a light emitting surface 70 disposed internally thereof, light emitting surface 70 comprising a luminescent or reflective sheet across a chord of elongated polymeric bar 44 having a circular cross section. Alternately, elongated polymeric bar 44 may have a flat surface 45 disposed along the length thereof, flat surface 45 comprising a chord of circular cross section bar with flat surface 45 interrupted as hereinafter described, the chord of polymeric bar 44 capturing light from light source 42 and transmitting the captured light through flat surface 45.

Preferably the opposed inside edges 62, 63 of flat flange 47 and of stepped flange 49, respectively, have a distance therebetween just slightly less than the width of apertures 16 and/or aperture 23 of opaque covering 13 of translucent covering 21 respectively, therefore light emanating from elongated polymeric bar 44 cannot illuminate any portion of an internal structure behind lighting assembly 12.

Housing 48 has a closed end 64 opposite an open end 65, closed end 64 adapted to retain elongated polymeric bar 44 within housing 48. Open end 65 receives elongated polymeric bar 44 therein, polymeric bar 44 retained between walls 67 and 68 of housing 48 by resting upon detents 66 disposed slightly above the inside edge 63, 62 of an internal surface of walls 67, 68, respectively. Elongated polymeric bar 44 is slightly longer than the internal length of housing 48 and thus protrudes from open end 65 a short distance to allow for placement of light sources 42 into receiving sockets 69 disposed into end 43 of elongated polymeric bar 44. Circuit board 46 is then retained upon end 65 of housings 48 with clips, not shown, anchored in holes 72 disposed through flanges 47, 49 adjacent end 65. Holes 72 are spaced sufficiently far apart in order to capture circuit board 46 therebetween whether lighting elements 39 are canted upper right to lower left or vice versa.

It should be readily apparent that by providing individual lighting elements 39, lighting elements 39 may be used singly or in a variety of combinations to produce lighting assemblies 12 particularly suited to the application. For instance, some luxury coach lights are arranged in triplets, others in pairs and still others singly, however, preferably lighting assembly 12 comprises four individual lighting elements 39 arranged as described above with plural sets of four individual lighting elements 39 arranged for the left side of a vehicle 20 and plural sets of four individual lighting elements 39 arranged for the right side of a vehicle 20. In the preferred embodiment of the window assembly 10 of this invention, three sets of lighting assemblies 12 are associated with interior surface 17 of opaque covering 13 for each side of the vehicle 20, the three sets of lighting assemblies 12 mounted to minor surface areas 24, 26 adjacent ends 18, 19 and on other minor surface area 27 as hereinbefore recited.

Individual light sources 42 are mounted upon circuit board 46 and spaced apart a distance substantially equal to the distance between apertures 16. A single set of electrical connection wires preferably lead from circuit board 46 to be connected to a power source, usually the 12 volt source onboard the vehicle 20, however other power sources are fully within the scope of this invention. Light sources 42 are preferably white light LED's, though other colors may be used, the LED's commonly driven at a voltage of 2.5 volts dc and are arranged in parallel with a resistor on one leg to provide for proper voltage to light sources 42. By mounting light sources 42 to circuit board 46, when one light source 42 needs replacing, it has been found by the inventor hereof that replacement of circuit board 46 is most cost effective as preventative maintenance is then effected for the entire lighting assembly 12.

Elongated transparent pane 11 is selected from solid tempered glass, safety glass, polymeric materials and combinations thereof but preferably elongated transparent pane 11 is a sheet of clear, solid tempered glass, however where used in a buildings and decorative applications, elongated transparent pane 11 may be thermopane glazing. Furthermore, tinted transparent sheets of tempered glass, laminated glass or plastic may be used, however, as hereinbefore mentioned tinting of apertures 16 reduces the amount of light at exterior surface 14 of elongated transparent pane 11. Elongated transparent pane 11 is preferably curved to the contour of the exterior surface of the vehicle 20 and thus elongated polymeric bars 44 are curved to match the interior curvature of elongated transparent pane 11. Elongated polymeric bars 44 are aligned with apertures 16 and housings 48 of lighting assembly 12 are adhered to interior surface 17 of opaque covering 13 associated with, applied to or adhered to elongated transparent pane 11 and when translucent covering 21 is used, apertures 23 are aligned with apertures 16 and housings 48 may be adhered directly to interior surface 25 of translucent covering 21. Of course, lighting assemblies 12 may be adhered directly to interior surface 15 of elongated transparent pane 11, especially where alternate apertures 16 are provided. Alternately, surface 45 of elongated polymeric bar 44 is an interrupted surface in order to direct light from end 43 through surface 45. Thus, surface 45 may be scarified, cross-hatched, knurled, ridged transversely, diffusion or diffraction grating or sand-blasted to cause light rays introduced endwise into elongated polymeric bar 44 to emanate from surface 45. Though surface 45 has been shown as a chord of a circular cross section elongated polymeric bar 44, it is understood that surface 45 could be an uncut external surface of elongated polymeric bar 44 as shown in dashed lines in FIG. 6.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A window pane assembly comprising a transparent glass pane, at least one white lighting element and at least one opaque covering, said transparent pane having said opaque covering associated with an interior surface thereof and having said lighting element mounted adjacent an interior surface of said opaque covering, said opaque covering covers a minor area of said interior surface adjacent opposite ends of said transparent pane, said opaque covering having at least one aperture disposed therethrough wherein said lighting element is aligned with one said aperture and light emanates from said lighting element only through said one aperture, through said transparent pane, said light appearing to propagate in a general shape of said aperture from an exterior surface of said transparent pane of said window pane assembly, said white light propagating from said exterior surface simulating a luxury automotive coach light and wherein said opaque covering has at least one sight window disposed therethrough, said sight window spaced longitudinally along said transparent glass pane from said lighting assembly.

2. A window pane assembly as in claim 1 wherein said lighting elements are selected from the group consisting of fiber optic, fluorescent tubes, single light sources such as incandescent bulbs, elongated polymeric bars with a light source at one end or combinations thereof.

3. A window pane assembly comprising a transparent glass pane, at least one lighting assembly, a translucent covering and at least one opaque covering, said transparent pane having said opaque covering associated with an interior surface thereof and said translucent covering associated with an interior surface of said opaque covering, said window pane assembly further having said lighting assemblies mounted adjacent said interior surface of said translucent covering, said opaque covering having at least one aperture disposed therethrough, said lighting assemblies aligned with respective said apertures wherein light emanates from said lighting assemblies through said respective apertures disposed through said opaque covering, through said translucent covering, through said transparent pane, said light propagating as a white light from an exterior surface of said transparent pane of said window pane assembly and wherein said opaque covering has at least one sight window disposed therethrough and located between one said lighting assembly mounted adjacent one end of said window pane assembly and another said lighting assembly mounted adjacent an opposite end of said window pane assembly.

4. A window pane assembly as in claim 3 wherein said translucent covering is tinted.

\* \* \* \* \*